(12) United States Patent
Tondorf

(10) Patent No.: US 6,810,601 B2
(45) Date of Patent: Nov. 2, 2004

(54) LENGTH OR ANGLE MEASURING APPARATUS WITH DIFFERENTIAL SCREW FOR MOIRE ADJUSTMENT

(75) Inventor: Sebastian Tondorf, Waging am See (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 10/362,392
(22) PCT Filed: Jul. 5, 2001
(86) PCT No.: PCT/EP01/07696
   § 371 (c)(1),
   (2), (4) Date: Feb. 24, 2003
(87) PCT Pub. No.: WO02/16862
   PCT Pub. Date: Feb. 28, 2002

(65) Prior Publication Data
US 2003/0172538 A1 Sep. 18, 2003

(30) Foreign Application Priority Data
Aug. 24, 2000 (DE) .......................... 100 41 692

(51) Int. Cl.⁷ ............................................... G01B 11/00
(52) U.S. Cl. .......................................... 33/706; 33/700
(58) Field of Search ................. 33/700, 706, 707, 33/708, 1 N, 1 L, 1 PT, 702

(56) References Cited

U.S. PATENT DOCUMENTS

| 3,727,471 | A | * | 4/1973 | Botos | ........................... 33/811 |
| 4,273,447 | A |   | 6/1981 | Nelle |  |
| 4,530,157 | A | * | 7/1985 | Nelle | ........................... 33/700 |
| 4,972,599 | A |   | 11/1990 | Ernst |  |
| 5,511,321 | A | * | 4/1996 | Nelle | ........................... 33/702 |
| 5,651,187 | A | * | 7/1997 | Affa | ............................ 33/706 |
| 5,664,336 | A | * | 9/1997 | Zanier et al. | .................. 33/706 |
| 5,845,412 | A | * | 12/1998 | Arcand | ........................ 33/758 |
| 6,532,681 | B2 | * | 3/2003 | Tondorf | ........................ 33/706 |
| 6,571,486 | B1 | * | 6/2003 | Tondorf et al. | ................ 33/706 |
| 6,578,283 | B2 | * | 6/2003 | Nishi | ........................... 33/706 |

FOREIGN PATENT DOCUMENTS

| DE | 1 639 199 | 9/1970 |
| DE | 1 764 815 | 10/1971 |
| DE | 28 44 066 | 4/1980 |
| DE | 197 48 802 | 5/1998 |
| EP | 0 441 125 | 8/1991 |

OTHER PUBLICATIONS

S. Hildebrand. "Feinmechanische Bauelemenet." Hanser Verlag. Muenchen Wien 1978. 3 Auflage. S 534–536.

* cited by examiner

*Primary Examiner*—Christopher W. Fulton
*Assistant Examiner*—Madeline Gonzalez
(74) *Attorney, Agent, or Firm*—Kenyon & Kenyon

(57) ABSTRACT

A length or angle measuring apparatus includes a holding device that may be turned by a differential screw and flector joint arranged to provide an adjustment of the angle between a scale and a scanning plate.

8 Claims, 1 Drawing Sheet

LENGTH OR ANGLE MEASURING APPARATUS WITH DIFFERENTIAL SCREW FOR MOIRE ADJUSTMENT

FIELD OF THE INVENTION

The present invention relates to a length- or angular measuring instrument. Measuring instruments of this kind are primarily used to determine the relative displacement or absolute position of movable machine parts, for example, in machine tools or measuring machines.

BACKGROUND INFORMATION

In length and angular measuring instruments of the foregoing type, a material measure, e.g., in the form of an optical grating, is scanned by a sensor which is mounted behind a scanning plate constituted as another grating. An exact adjustment of the angle between the two gratings is necessary, in this context, to avoid the moiré effect produced when working with gratings which are tilted towards one another, in that the two gratings are positioned in parallel, or to intentionally produce a moiré effect in that a specific angle is precisely adjusted. When a plurality of marks is applied to the material measure, the effect of angular errors which are too great is that the relationship among the marks is lost. In some situations, a reference mark is no longer able to be allocated to the correct period of an incremental graduation.

To adjust the moiré angle between the material measure of a scale and the scanning plate of a scanning unit, German Published Patent Application No. 28 44 066 describes a lever arm which is secured, on one side via a flector joint to a movable or stationary machine part and, on the other side, has an adjustment screw, which is supported on this machine part and which bears the scanning head, together with the scanning plate. Thus, when the screw is adjusted, the lever arm, together with the scanning unit, swivel, so that the moiré angle is adjusted, in turn.

A disadvantage of this system is that it does not permit a precise adjustment of the moiré angle. Given a typical lever arm length of 50 mm and an adjustment screw having a screw pitch of 0.8 mm, an angular change of 16 mrad results for one turn of the screw. Moreover, in this system, the lever arm is only protected in one direction against vibrations. For that reason, the scanning unit must be secured by an additional clamping screw.

It is conventional, as a fine-adjustment gear, to use a dual screw gear having a differential screw, as described, for instance, by S. Hildebrand: Feinmechanische Bauelemente ("Precision-Mechanical Components"), Hanser Publishers, Munich, Vienna 1978, 3rd edition, pp. 534–536. A dual screw gear permits a precise adjustment in the linear direction, since, in the context of one screw turn, the change in the distance between two objects joined by the differential screw corresponds to exactly the difference between the two pitches of the differential screw.

It is an object of the present invention to provide a length or angular measuring instrument which may permit a fine adjustment of the moiré angle, a low-vibration attachment of the scanning unit, and thereby may make do with few components.

SUMMARY

This objective is achieved by providing a device as described herein. Further example embodiments of the present invention are also described herein.

A lever, which is secured via a flector joint to the fixed or movable machine part, is able to be adjusted in that, instead of a conventional screw resting on this machine part, a differential screw is provided, which is screw-coupled by its first thread to the lever and, by its second thread, to this machine part. If, at this point, one turns the screw by one rotation, the distance of this lever end to this machine part changes precisely by the difference in the pitches, when the directional sense of the pitch is the same. As a result, the lever changes its inclination, since it is executing a rotary motion about the flector joint. In the above mentioned example, given thread pitches of 0.7 mm and 0.8 mm, a change in distance of 0.1 mm results for one rotation of the differential screw, and thus an angular change of approximately 2 mrad. Thus, the adjustment may be carried out in a more precise manner than conventionally possible. Since the dual screw coupling may provide protection from vibrations in two directions, the need may be eliminated for an additional clamping of the lever. In addition, the differential screw is pretensionsed or biased by the axial forces which arise in response to deformation of or strain on the flector joint. Moreover, the differential screw is clamped by the mutual tilting of its two drilled holes. It may thereby be screw-coupled in a self-locking manner.

Further aspects of, as well as details pertaining to the present invention are set forth in the following description of the Figure, which shows a design in accordance with the present invention of a device for adjusting a scanning head.

DETAILED DESCRIPTION

Figure 1:
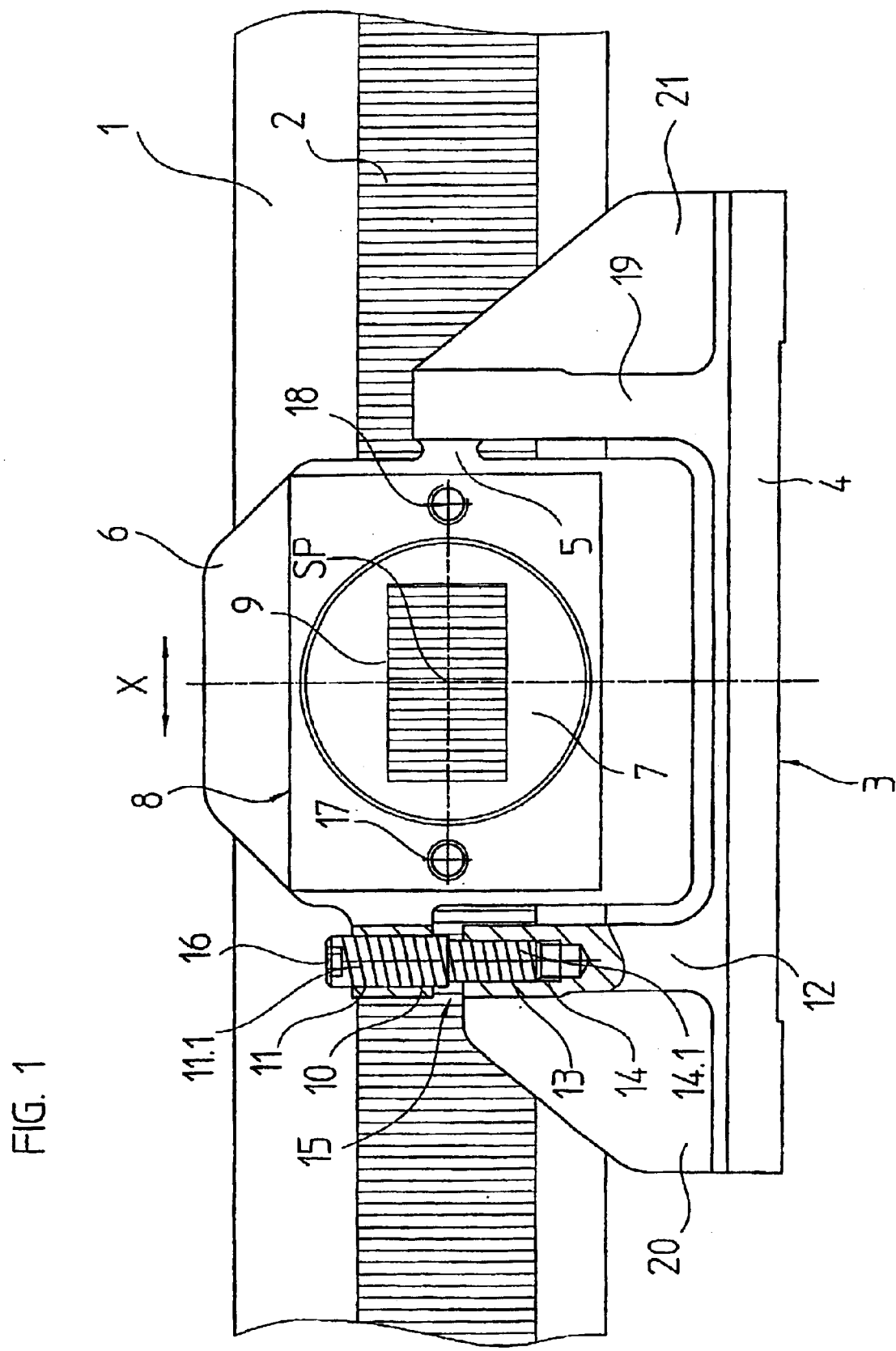
FIG. 1 is a schematic view of a measuring instrument according to the present invention.

FIG. 1 illustrates a scale 1 having a material measure 2 in the form of an incremental graduation. In the example embodiment illustrated, scale 1 is permanently connected to the machine. An adjustment device 3 is connected to a movable part of the machine along measuring direction X.

Adjustment device 3 is fabricated from one piece and is composed of a base 4, on which a lever in the form of a mounting support 6 is hinge-mounted via a flector joint 5. In this context, flector joint 5, arranged as a web between base 4 and mounting support 6, permits a rotation of mounting support 6 about an axis perpendicularly to the plane of material measure 2.

Mounting support 6 has an opening 7 for receiving scanning unit 8. Scanning unit 8 includes a scanning plate 9, the alignment of which may be adjusted with respect to material measure 2 in order, for example, to avoid moiré effects or to achieve such effects to the desired degree. A sensor is situated behind scanning plate 9, or the sensor itself is structurally arranged to fulfill the function of scanning plate 9.

On the side opposite elector joint 5, mounting support 6 has a bore 10 having internal screw thread 11. Also discernible on base 4 is an arm 12, which bears a bore 13 having internal thread 14, so that bore 10 and bore 13 are situated on a common axis. Between mounting support 6 and base 4, a gap 15 remains which allows mounting support 6 to tilt about flector joint 5. The diameter of bore 10 is larger than the diameter of bore 13. This may enable a simple pushing-through and bolting-on action when installing differential screw 16. However, given the same diameters, other design approaches are possible.

The pitch of internal thread 11 is larger than the pitch of internal thread 14. In one half, a differential screw 16 has a thread 11.1, the pitch and diameter of which match internal thread 11. In the other half, a thread 14.1 is provided, the pitch and diameter of which match internal thread 14.

Prior to mounting scanning unit 8, differential screw 16 is screw-coupled to base 4 and mounting support 6, in order to pretension or bias flector joint 5. Because of the different pitches of internal threads 11 and 14, gap 15 is enlarged or reduced in the process, depending on the directional sense of internal thread 11 and 14 and the direction of rotation of differential screw 16. In this state, scanning unit 8 may then be mounted on mounting support 6 and, following a rough adjustment, be bolted on at bores 17 and 18. By turning differential screw 16, the angle between scanning plate 9 and material measure 2 may be adjusted in that mounting support 6 is rotated around flector joint 5.

The width of gap 15 between bores 10 and 13 may change in response to a turn of differential screw 16 precisely by the difference in the pitches of internal threads 11 and 14. Thus, the adjustment may be carried out with exceptional precision.

Since the two-sided screw coupling provided by differential screw 16 prevents mounting support 6 from moving in the direction of bores 10 and 13, no more vibrations may occur in this direction. Flector joint 5 is blocked. The need may be eliminated for an additional clamping screw.

If, moreover, as illustrated, flector joint 5 is positioned to lie with the common center of mass SP of scanning unit 8 and mounting support 6 on an axis in parallel with measuring direction X, then in response to acceleration of adjustment device 3 in measuring direction X, no moment of torque may occur with respect to the above defined axis of rotation of flector joint 5. This may further enhance the stability of the system.

The adjustment device may be further strengthened when arms 12 and 19 of base 4 are reinforced by ribs 20 and 21 which extend in measuring direction X and perpendicularly to scale 1.

In another example embodiment of the present invention, the adjustment device according to the present invention may be integrated in the scanning unit and, in that manner, only the scanning plate itself or a sensor acting as a scanning plate is adjusted.

The described principle for adjusting scanning units may not be limited to applications in length and angular measuring instruments based on optical scanning. Its application in other systems is also possible, such as those which are based on magnetic material measures and which are scanned using magnetoresistive sensors or Hall sensors. Also possible are capacitive or inductive sensors having corresponding material measures.

What is claimed is:

1. A measuring instrument, comprising:
   a scanning unit;
   a material measure arranged opposite the scanning unit; and
   an adjustment device including:
      a base;
      a mounting support joined to the base via a flector joint and configured to support the scanning unit; and
      a differential screw including two threads of different pitches, the differential screw screw-coupled by a first thread to a first bore in the mounting support and by a second thread to a second bore in the base.

2. The measuring instrument according to claim 1, wherein the measuring instrument is configured for one of length measurement and angle measurement.

3. The measuring instrument according to claim 1, wherein the base, the flector joint and the mounting support are formed from one piece.

4. The measuring instrument according to claim 1, wherein the base includes arms having bores arranged to receive the differential screw and ribs arranged to reinforce the flector joint and the bores.

5. The measuring instrument according to claim 1, wherein the threads of the differential screw have different diameters.

6. The measuring unit of claim 1, wherein the mounting support is only connected to the base via the flector joint and the differential screw.

7. A measuring instrument, comprising:
   a scanning unit;
   a material measure arranged opposite the scanning unit; and
   an adjustment device including:
      a base;
      a mounting support joined to the base via a flector joint and configured to support the scanning unit; and
      a differential screw including two threads of different pitches, the differential screw screw-coupled by a first thread to the mounting support and by a second thread to the base;
   wherein the flector joint and a common center of mass of the scanning unit and the mounting support are arranged on one axis parallel to a measuring direction.

8. A measuring instrument, comprising:
   a scanning unit;
   a material measure arranged opposite the scanning unit; and
   an adjustment device including:
      a base;
      a mounting support joined to the base via a flector joint and configured to support the scanning unit; and
      a differential screw including two threads of different pitches, the differential screw screw-coupled by a first thread to the mounting support and by a second thread to the base;
   wherein the differential screw is configured to be clamped in a self-locking manner by mutual tilting of bores about the flector joint.

* * * * *